3,772,313
PYRIDYL ISOCYANATES
Ulrich von Gizycki and Gunter Oertel, Cologne-Flittard, and Gunther Beck and Kurt Findeisen, Leverkusen, Germany, assignors to Bayer Aktiengesellschaft, Leverkusen, Germany
No Drawing. Filed Mar. 23, 1971, Ser. No. 127,378
Int. Cl. C07d 31/40
U.S. Cl. 260—296 C                2 Claims

ABSTRACT OF THE DISCLOSURE a-Pyridyl, a-pyrimidyl and a-pyrazinyl isocyanates which contain electronegative substituents in the ring are prepared by reacting the corresponding amino compounds with oxalyl chloride. Due to the high reactivity of the —NCO group these compounds are particularly useful as cross linking agents and modifiers for compounds containing Zerewitinoff-active hydrogen.

This invention relates to organic isocyanates and more particularly to a new class of heterocyclic isocyanates and a method for their preparation.

Pyridines and analogues of pyridine substituted by isocyanate groups in the position adjacent the ring nitrogen have hitherto been unknown.

It is therefore an object of this invention to provide a-pyridal, a-pyrimidyl and a-pyrazinyl isocyanates which contain electronegative substituents in the ring. It is another object of this invention to provide a-pyridal, a-pyrimidyl and a-pyrazinyl isocyanates which contain electronegative substituents in the ring.

The foregoing objects and others are accomplished in accordance with the invention, generally speaking, by providing heterocyclic isocyanates, which contain a maximum of two ring nitrogen atoms, having the general formula

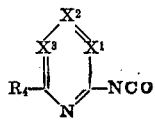

wherein $X^1$ is nitrogen or a

radical, wherein $R_1$ is halogen, halogen alkyl, cyano or nitro;

$X^2$ is nitrogen or a

radical, wherein $R_2$ is halogen, halogen alkyl, cyano or nitro;

$X^3$ is nitrogen or a

radical, wherein $R_3$ is hydrogen, halogen, halogen alkyl, aryl, alkyl, alkylene, aryl carbonyl, alkyloxy carbonyl, aryloxy carbonyl or halogen carbonyl; and $R_4$ is the same as $R_3$ and together with $R_3$ can form a condensed ring.

The heterocyclic compounds of the invention are readily obtained by reacting a corresponding amino compound having the formula

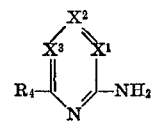

wherein $X^1$, $X^2$, $X^3$ and $R_4$ are as defined hereinabove, preferably in an inert organic solvent such as, for example, benzene, toluene or chlorobenzene, with at least 1, and preferably about 1.5 to about 3.5 mols of oxalyl chloride per mol of the amino compound. The reaction may be carried out at a temperature of from about 0° C. to about 250° C. and preferably at a temperature of from about 40° C. to about 180° C. As a rule, the starting amine which may be dissolved in an inert solvent, is added dropwise to a boiling mixture of oxalyl chloride and inert solvent, and the resulting mixture maintained at the boil until the evolution of gas has ceased, in accordance with the following reaction

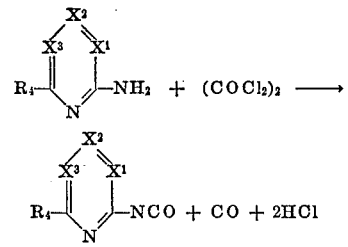

The reaction mixture is then separated by conventional distillation techniques to yield the corresponding isocyanate in a purified form.

Thus, according to the invention heterocyclic isocyanates, having a maximum of two ring nitrogen atoms, having the general formula

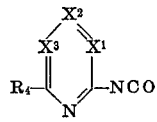

in which $X^1$, $X^2$, $X^3$ and $R_4$ are as defined above, are prepared from an amino compound, having a maximum of 2 ring nitrogen atoms, having the general formula

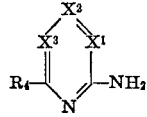

wherein $X^1$, $X^2$, $X^3$ and $R_4$ are as defined above, wherein the amino compounds are reacted with at least 1 mol of oxalyl chloride per mol of amino compound at a temperature of from about 0° C. to about 250° C.

Some amino compounds of the above formula, which are suitable starting components in the process of the invention are, for example, tetrachloro-a-aminopyridine,
3,4,5-trichloro-a-aminopyridine,
tetrafluoro-a-aminopyridine,
3,5,6-trichloro-4-phenyl-a-aminopyridine,
3-trichloromethyl-5,6-dibromo-a-aminopyridine,
3,4-dichloro-6-dichloromethyl-a-aminopyridine,
3,5-dinitro-6-chloro-a-aminopyridine,
3,6-dichloro-4-cyano-a-aminopyridine,
3-chlorocarbonyl-4,5,6-trichloro-a-aminopyridine,
3,4,5,6,7,8-hexachloro-a-aminoquinoline,
4,5,6-trichloro-2-aminopyrimidine,
4,5,6-trifluoro-2-aminopyrimidine,
4,6-dichloro-5-dichloromethyl-2-pyrimidine,
4,5,6-tricyano-2-aminopyrimidine,
4,6-dibromo-5-nitro-2-aminopyrimidine,
4,6-difluoro-2-aminopyrimidine,
4,6-dichloro-5-phenylcarbonyl-2-aminopyrimidine,
2,5,6-trichloro-4-aminopyrimidine,
2-dichloromethyl-5,6-dichloro-4-aminopyrimidine,
2-pentachloroethyl-5,6-dichloro-4-aminopyrimidine,
2-phenyl-3,6-dichloro-4-aminopyrimidine,
2,5,6-trifluoro- and 2,5,6-tribromo-4-aminopyrimidine,
2-cyano-5,6-difluoro-4-aminopyrimidine,
2,5-difluoro-4-aminopyrimidine,
2-fluoro-5,6-dichloro-4-aminopyrimidine,
2-cyano-5,6-difluoro-4-aminopyrimidine,
2,5-difluoro-4-aminopyrimidine,
2-fluoro-5,6-dichloro-4-aminopyrimidine,
2,6-dichloro-5-nitro-4-aminopyrimidine,
2-phenylcarbonyl-5-trichloromethyl-6-cyano-4-aminopyrimidine,
trichloro-aminopyrazine,
trifluoroaminopyrazine,
2,5-dichloro-6-trichloromethyl-3-aminopyrazine,
2,5-dibromo-6-phenyl-3-aminopyrazine,
tris-(trichloromethyl)-aminopyrazine,
2-chloro-5,6-dicyano-3-aminopyrazine and the like.

Amino compounds corresponding to the above general formula which are substituted by chlorine in at least one a-position to a ring nitrogen atom are preferably used in the process according to the invention.

The heterocyclic isocyanates produced by the process of the invention are usually colorless, liquid or crystalline compounds and are highly sensitive to atmospheric moisture due to their extremely high reactivity.

The compounds of the invention are suitable for use in the production of optical brighteners and dyes, as reactive components for dyes, as crosslinking agents for plastics and as intermediate products for the preparation of plant protection agents and pharmaceutical preparations.

Those compounds which are substituted by chlorine in at least one a-position to a ring nitrogen atom are of particular interest. Monofunctional isocyanates of this type can be regarded as difunctional or polyfunctional compounds whose functional groups differ in their reactivity by virtue of the activated chlorine atoms in the a-position to the ring nitrogen atom.

The NCO group in these isocyanates is about ten times more reactive than conventional aliphatic and aromatic monoisocyanates and diisocyanates, and as a consequence can be reacted, for example, in an anhydrous medium with any low molecular weight and high molecular weight compounds containing Zerewitinoff-active hydrogen without any danger of promoting complete cross linking through the activated halogen in the initial reaction stage.

Low molecular weight or high molecular weight compounds modified in this way such as, for example, dyes, polyethers and polyesters containing amino groups or hydroxyl groups may then be cross linked in a second reaction stage by heat treatment or basic treatment with a low molecular weight or high molecular weight compound containing Zerewitinoff-active hydrogen atoms, accompanied by the elimination of hydrogen chloride.

Due to the high reactivity of the NCO group of the compounds prepared in accordance with the process of the invention a fairly wide range of compounds containing active hydrogen atoms may be modified as described hereinabove.

As a result, the heterocyclic isocyanates of the invention which are chlorine-substituted in the a-position to the ring nitrogen atom are superior to the diisocyanates frequently used for this purpose, and also to cross linking agents of the cyanuric chloride type, since they combine the properties of both the diisocyanates and cyanuric chlorides, without manifesting of the disadvantages in the first or second reaction stages as do the conventional types of compounds.

The invention is further illustrated but it is not intended that it be limited by the following examples in which all parts and percentages are by weight unless otherwise indicated.

EXAMPLE 1

Preparation of 3,4,5,6-tetrachloro-a-pyridyl isocyanate

A solution of about 45 parts of 3,4,5,6-tetrachloro-a-aminopyridine (W. I. Sell and F. W. Dootson, J. Chem. Soc. (London) 73, 781 (1898)), in about 750 parts by volume of dry benzene is added dropwise at reflux temperature to a mixture of about 60 parts of oxalyl chloride in about 400 parts by volume of benzene. The mixture is boiled under reflux until the evolution of gas has ceased. Distillation yields about 42 parts of the isocyanate of a boiling point of 101° C. to 102° C. at 0.05 mm. to 0.06 mm. Hg. The colorless distillate solidifies in the receiver.

EXAMPLE 2

Preparation of 4,5,6-trichloropyrimidyl-2-isocyanate

A solution of about 13 parts of 4,5,6-trichloro-2-aminopyrimidine (Scott J. Childress and R. L. MacKee, J. Am. Soc. 72, 4271 (1950)) in about 450 parts by volume of absolute benzene is added dropwise at reflux temperature to a mixture of about 20 parts of oxalyl chloride in about 100 parts by volume of absolute benzene. The mixture is boiled under reflux until the evolution of gas has ceased (about 2 hours). On distillation, about 11 parts of the isocyanate having a boiling point of 90° C. to 91° C. at 0.06 mm. Hg. are obtained. The colorless distillate solidifies in the receiver.

EXAMPLE 3

Preparation of 2,5,6-trichloropyrimidyl-4-isocyanate

A solution of about 17 parts of 2,5,6-trichloro-4-aminopyrimidine (H. Ackermann and P. Dussy, Helv. Chim. Acta. 45, 1683 (1962)) in about 450 parts by volume of absolute benzene is added dropwise at reflux temperature to a mixture of about 20 parts of oxalyl chloride in about 100 parts by volume of absolute benzene. The reaction mixture is boiled under reflux until the evolution of gas has ceased (about 2 hours). On distillation, about 11 parts of the isocyanate having a boiling point of 81° C. to 82° C. at 0.05 mm. Hg are obtained in the form of a colorless liquid.

Preparation of the starting materials used in Examples 4 to 7 5,6-dichloro-2-pentachloroethyl-4-aminopyridine Gaseous ammonia is introduced into a solution of about 115 parts (0.3 mol) of 4,5,6-trichloro-2-pentachloroethyl pyrimidine in about 1000 parts by volume of dioxane until the exothermic reaction ceases. The reaction mixture is heated to the reflux point over a period of about one hour during which additional gaseous ammonia is introduced. After most of the solvent is distilled off, the reaction mixture is poured into ice water, the deposit filtered under suction, washed with water and dried. Recrystallization yields about 100 parts of the aminopyridine having a melting point of about 174° C.

The following compounds are similarly prepared

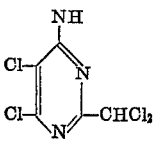

melting point: 207°C.
solvent: benzene

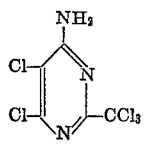

melting point: 90°C. to 91°C.
solvent: petroleumether

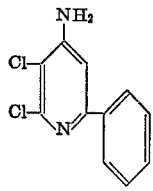

melting point: 193°C. to 194°C.
solvent: dioxane

Preparation of the 2-substituted-4,5,6-trichloropyrimidines used as starting compounds is described in Belgian Pat. 726,729.

EXAMPLE 4

Preparation of 5,6-dichloro-2-dichloromethyl-pyrimidyl-4-isocyanate

A solution of about 20 parts of 5,6-dichloro-2-dichloromethyl-4-aminopyrimidine in about 350 parts by volume of absolute benzene is added dropwise at reflux temperature to a mixture of about 25 parts of oxalyl chloride in about 100 parts by volume of absolute benzene, and the reaction mixture is boiled under reflux until the evolution of gas has ceased (about 7 hours). After distillation, about 15 parts of the isocyanate having a boiling point of 93° C. at 0.03 mm. Hg are obtained in the form of a colorless liquid.

EXAMPLE 5

Preparation of 5,6-dichloro-2-trichloromethyl-pyrimidyl-4-isocyanate

A solution of about 20 parts of 5,6-dichloro-2-trichloromethyl-4-aminopyrimidine in about 150 parts by volume of absolute benzene is added dropwise at reflux temperature to a mixture of about 25 parts of oxalyl chloride in about 100 parts by volume of absolute benzene, and the reaction mixture is boiled under reflux until the evolution of gas ceases (about 10 hours). After distillation, about 15 parts of the isocyanate which boils at about 115° C. at 0.05 mm. Hg are obtained in the form of colorless liquid which gradually solidifies in the receiver.

EXAMPLE 6

Preparation of 5,6-dichloro-2-pentachloroethyl-pyrimidyl-4-isocyanate

A solution of about 20 parts of 5,6-dichloro-2-pentachloroethyl-4-aminopyrimidine in about 150 parts by volume of absolute benzene is added dropwise over a period of about 30 minutes at reflux temperature to a mixture of about 25 parts of oxalyl chloride in about 100 parts by volume of absolute benzene. The reaction mixture is further heated until the evolution of gas ceases (about 10 hours). The clear yellowish solution is distilled and yields about 15 parts of the isocyanate which boils at about 143° C. to 144° C. at 0.1 mm. Hg in the form of a colorless liquid which crystallizes in the receiver.

EXAMPLE 7

Preparation of 5,6-dichloro-2-phenyl-pyrimidine-4-isocyanate

About 85 parts of dichloro-2-phenyl-4-aminopyrimidine are dissolved under heat in about 1500 parts by volume of hot benzene and the resulting solution added dropwise at reflux temperature to a mixture of about 100 parts of oxalyl chloride in about 500 parts by volume of absolute benzene over a period of about 1.25 hours. The reaction mixture is then further heated until the evolution of gas ceases (about 2 hours). The reaction product is distilled yielding about 90 parts of the isocyanate which boils at about 147° C. to 148° C. at 0.1 mm. to 0.2 mm. Hg. The isocyanate immediately solidifies in the receiver to form colorless crystals melting at about 90° C. to 92° C.

EXAMPLE 8

Preparation of trichloro-isocyanato-pyrazine

About 10 parts of trichloroaminopyrazine are dissolved in about 50 parts by volume of absolute benzene and the resulting solution is added dropwise to a boiling mixture of about 50 parts by volume of benzene and about 20 parts of oxalyl chloride over a period of about 45 minutes. The mixture is kept under reflux until the evolution of gas ceases (about 8 hours). After cooling, the mixture is filtered off from about one part of a crystalline deposit and the filtrate is concentrated by evaporation in a water jet vacuum. The colorless residue is distilled in a high vacuum, yielding about 7 parts of the isocyanate melting at 65° C. to 70° C. and boiling at about 100° C. at 0.07 mm. Hg.

Although the invention has been illustrated in considerable detail in the foregoing examples it is to be understood that such exemplification is solely for purposes of illustration and that any of the components listed as suitable herein may be freely substituted for their counterparts and that one skilled in the art may make many variations without departing from the spirit and scope of the invention.

What is claimed is:

1. A pyridyl isocyanate of the formula:

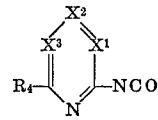

wherein
$X^1$ is a

radical wherein $R_1$ is halogen or halo-methyl;
$X^2$ is a

radical wherein $R_2$ is halogen or halo-methyl;
$X^3$ is a

radical wherein $R_3$ is halogen or halo-methyl; and
$R_4$ is halogen, halo-methyl or phenyl.

2. An a-pyridyl isocyanate of claim 1 having the formula

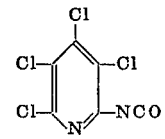

References Cited

Roberts et al., Basic Principles of Organic Chemistry, Benjamin, p. 806 (1965), QD 251 R 58 C.6.

Noller, Chemistry of Organic Compounds, third edition, Saunders, p. 339.

ALAN L. ROTMAN, Primary Examiner

U.S. Cl. X.R.

260—77.5 R, 250 R, 250 A, 251 R, 256.4 N, 296 R

UNITED STATES PATENT OFFICE
CERTIFICATE OF CORRECTION

Patent No. 3,772,313      Dated November 13, 1973

Inventor(s) Ulrich von Gizycki et al.

It is certified that error appears in the above-identified patent and that said Letters Patent are hereby corrected as shown below:

Column 1, in the heading, add the following:

-- Claims priority application Germany, March 26, 1970

P 20 14 762.0 --.

Signed and Sealed this eleventh Day of May 1976

[SEAL]

Attest:

RUTH C. MASON
Attesting Officer

C. MARSHALL DANN
Commissioner of Patents and Trademarks